(12) United States Patent
Bourdeau et al.

(10) Patent No.: US 6,473,420 B1
(45) Date of Patent: Oct. 29, 2002

(54) WIDEBAND RANGING PROCESS FOR FREQUENCY ACQUISITION

(75) Inventors: Richard Bourdeau, St. Laurent (CA); Amévi Klutsé Ekuhoho, Pierrefonds (CA)

(73) Assignee: Harris Corporation, Melbourne, FL (US)

( * ) Notice: Subject to any disclaimer, the term of this patent is extended or adjusted under 35 U.S.C. 154(b) by 14 days.

(21) Appl. No.: 09/783,965

(22) Filed: Feb. 16, 2001

(51) Int. Cl.[7] .................................................. H04J 3/06
(52) U.S. Cl. ...................................................... 370/350
(58) Field of Search ................................ 370/324, 328, 370/330, 343, 345, 350, 503, 516, 517, 519; 375/357, 358, 362, 364, 371

(56) References Cited

U.S. PATENT DOCUMENTS

| | | | | |
|---|---|---|---|---|
| 5,613,193 A | * | 3/1997 | Ishikawa et al. | 455/12.1 |
| 5,625,573 A | * | 4/1997 | Kim | 375/344 |
| 5,732,113 A | * | 3/1998 | Schmidl et al. | 375/355 |
| 5,889,759 A | * | 3/1999 | McGibney | 370/207 |
| 6,021,110 A | * | 2/2000 | McGibney | 370/208 |
| 6,058,101 A | * | 5/2000 | Huang et al. | 370/208 |

\* cited by examiner

*Primary Examiner*—Kwang Bin Yao
(74) *Attorney, Agent, or Firm*—Duane Morris LLP

(57) ABSTRACT

A system and method for synchronizing a hub radio and a remote radio by initially changing the frequency of the remote radio by a predetermined frequency offset, and then stepwise changing the frequency as a function of the tolerance of the hub radio to synchronize.

16 Claims, 3 Drawing Sheets

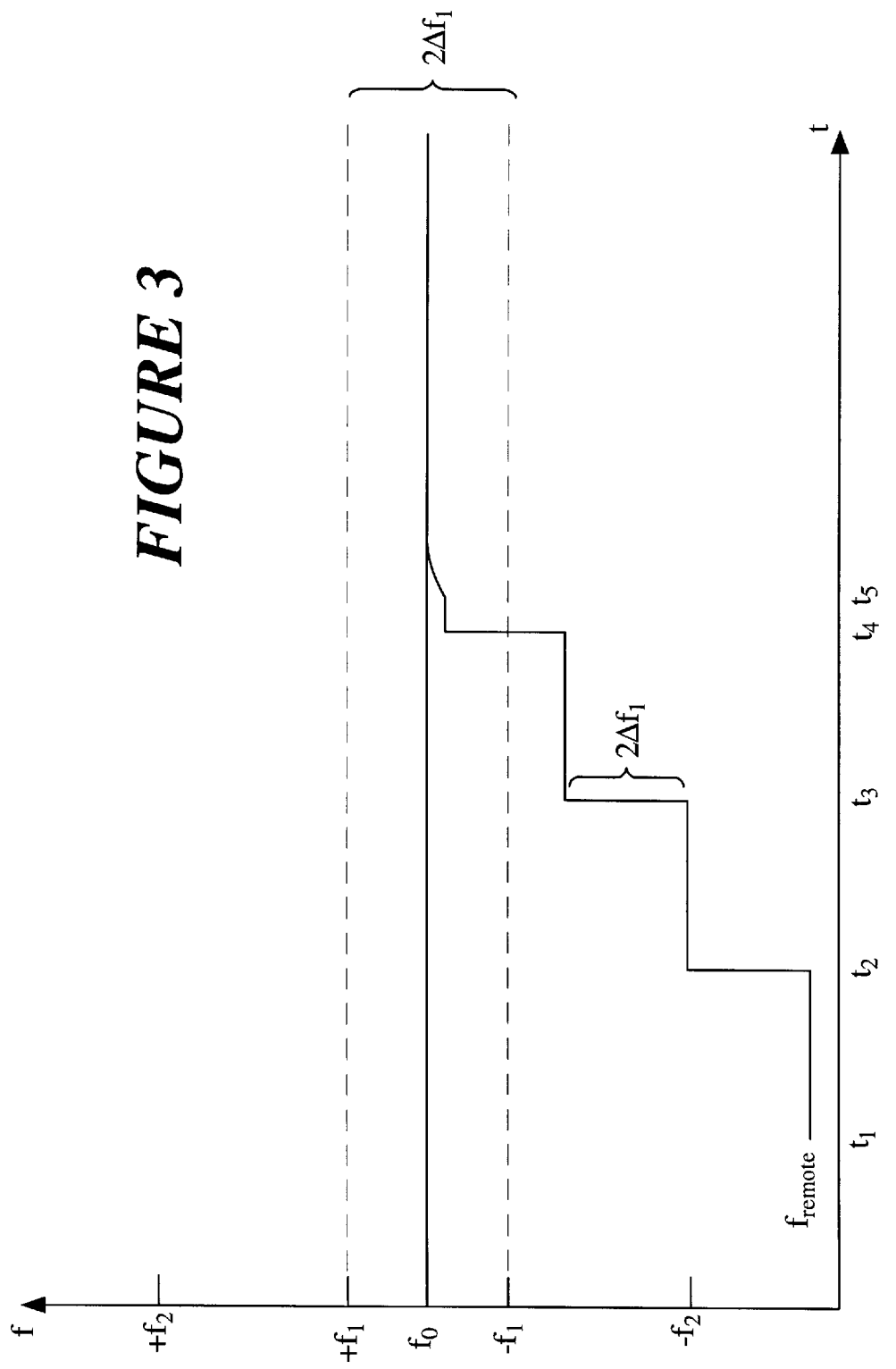

WIDEBAND RANGING PROCESS FOR FREQUENCY ACQUISITION

BACKGROUND OF THE INVENTION

Applicant's disclosure is directed to an improved method of synchronizing a hub radio and a remote radio. Specifically, applicant's disclosure is directed to an improved method of synchronizing plural radios in a point-to-multipoint Broadband Wireless Access (BWA) communication system which uses Time Division Multiple Access (TDMA).

In a conventional communication system, each transceiver or radio may have a modem for modulating and demodulating the signals communicated between the transceivers. In order for a demodulator to correctly demodulate a received signal, the frequency of the receiving transceiver must be synchronized to the frequency of the transmitting transceiver. The process of synchronizing the frequency of one transceiver with the frequency of another transceiver is known as ranging. The ranging process typically occurs when a transceiver is first powered up, and then periodically to ensure it is synchronized with other transceivers in the system. Typically, the frequency of one of the transceivers is held constant while the frequency of the other transceivers is adjusted to synchronize the frequencies.

In a conventional point-to-multipoint communication system, in which a hub radio communicates with a plurality of remote radios utilizing a single frequency, it is common to use Time Division Multiple Access (TDMA) to prevent interference between the radios. It is crucial that the hub and the remote radios are synchronized to the same frequency. In principal, each of the radios transmit at the same frequency. However, due to frequency source uncertainties, which may vary from radio to radio, the signals transmitted to the hub radio may arrive with varying frequency offsets. If the frequency offset for a given remote radio is greater than the frequency tolerance of the hub radio, then the frequency offset is outside of the frequency range of capture of the hub radio and therefore the hub radio will be unable to synchronize with that remote radio. For a point-to-multipoint communication system, it is common to maintain the frequency of the hub radio constant, and adjust the frequency of each of the remote radios to match the frequency of the hub radio.

In one prior art ranging process, the hub radio will transmit a synchronization signal to the remote radios. Each remote radio will then perform a complex quantitative sampling of the received synchronizing signal and derive the frequency of the hub radio from the synchronizing signal. The remote radio will then adjust is frequency to match that of the hub radio. The remote will send a ranging signal at the newly adjusted frequency and this iterative process between the remote radio and the hub radio continues until the radios are synchronized or some predetermined time limit is reached. This type of ranging process requires that each remote have the ability to perform complex signal processing in order to derive the frequency of the hub radio from the synchronizing symbol.

In another prior art ranging process, the remote radio initiates the process by providing a ranging signal to the hub radio. The hub radio samples the received ranging signal and estimates the transmission frequency of the remote radio. The hub radio determines the frequency offset between the respective frequencies of the hub radio and the remote radio and determines a frequency offset correction necessary to adjust the frequency of the remote radio to match the frequency of the hub radio. The hub radio transmits a synchronizing signal to the hub radio which provides the remote radio with the frequency offset correction. The remote radio receives the frequency offset correction from the synchronizing signal and adjusts its frequency accordingly. The remote radio will transmit another ranging signal at the adjusted frequency and this iterative process between the remote radio and the hub radio continues until the radios are synchronized or some predetermined time limit is reached. This type of ranging process requires that the hub radio have the capability to perform complex signaling processing and waveform analysis of the ranging signals in order to determine the frequency offset for each of the remote radios.

Thus, the prior art ranging systems typically require complex and expensive signaling processing equipment. These prior art ranging systems are generally unable to synchronize radios where the frequency offset between the radios exceeds 64 kHz. In Broadband Wireless Access (BWA) systems, it is not uncommon to see frequency offsets in excess of 64 kHz, and therefore the prior art synchronization systems are not adequate for use in a BWA communication systems.

The present disclosure is directed to a synchronizing method which does not require complex signaling processing and is able to synchronize at frequency offsets much greater than the prior art systems.

Accordingly, it is an object of the present invention to provide a novel method and of achieving synchronization between radios in a point-to-multipoint TDMA communication system.

It is another object of the present invention to provide a novel method of increasing the frequency range of capture for a radio synchronization system.

It is yet another objective of the present invention to provide a novel system for frequency synchronization that does not require complex signaling processing.

It is still another object of the present invention to provide a novel method of frequency synchronization between a hub radio and remote radios in a BWA system.

It is yet still another object of the present invention to provide a novel system for reducing the time required to synchronize radios.

It is still another object of the present invention to provide a novel method of synchronizing a remote radio with a hub radio as a function of the hub radio's frequency tolerance.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 3 is a high level graphical representation of the ranging process utilized by the present invention.

DESCRIPTION OF THE PREFERRED EMBODIMENTS

Figure 1:
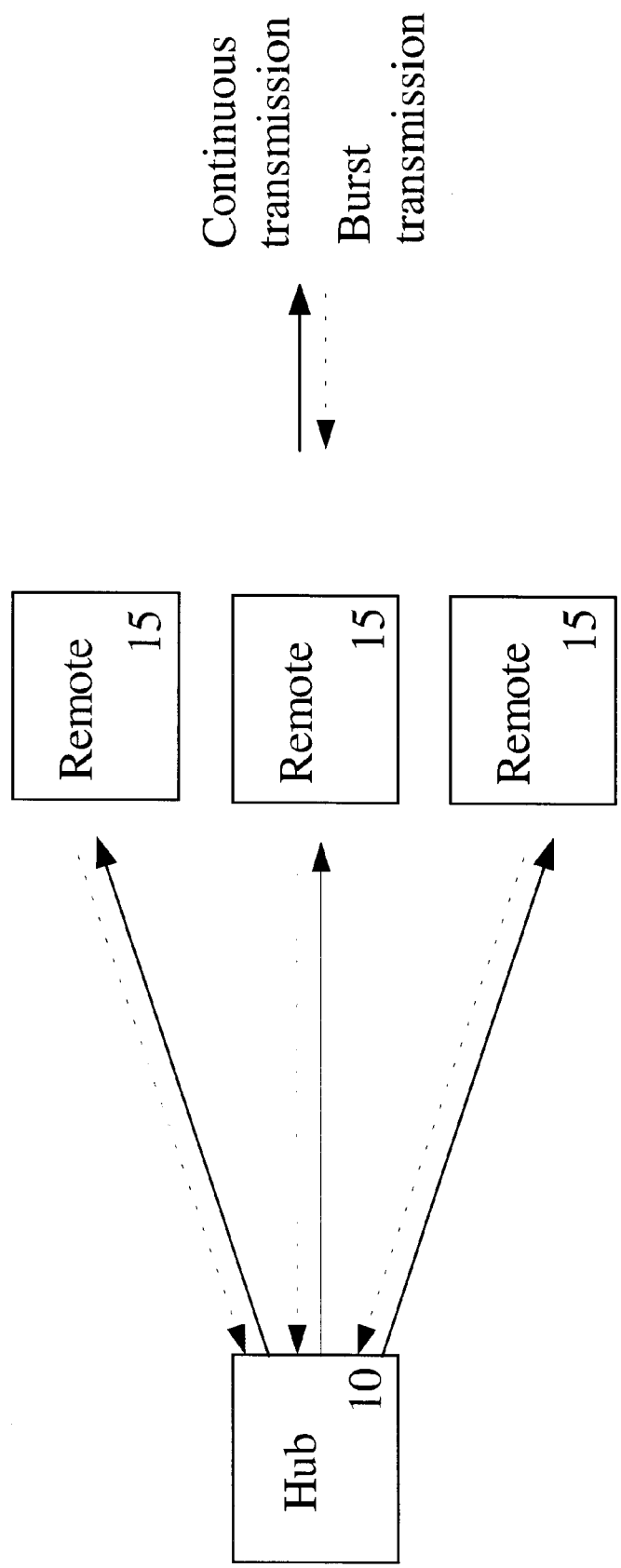
FIG. 1 is a pictorial representation of a conventional TDMA communication system.

FIG. 1 illustrates a typical arrangement of a prior art point to multipoint communication system. The hub radio 10 transmits simultaneously to all remote radios 20 within the hub radio's transmission area using continuous transmission. The remote radios 20 transmit to the hub radio 20 using burst transmission. Because each of the remotes transmit at the same frequency, Time Division Multiple Access (TDMA) is used to prevent interference between the radios. While in theory, each of the remotes transmits at the same frequency, frequency source tolerance, fading and doppler shifting introduce frequency offsets.

Figure 2:
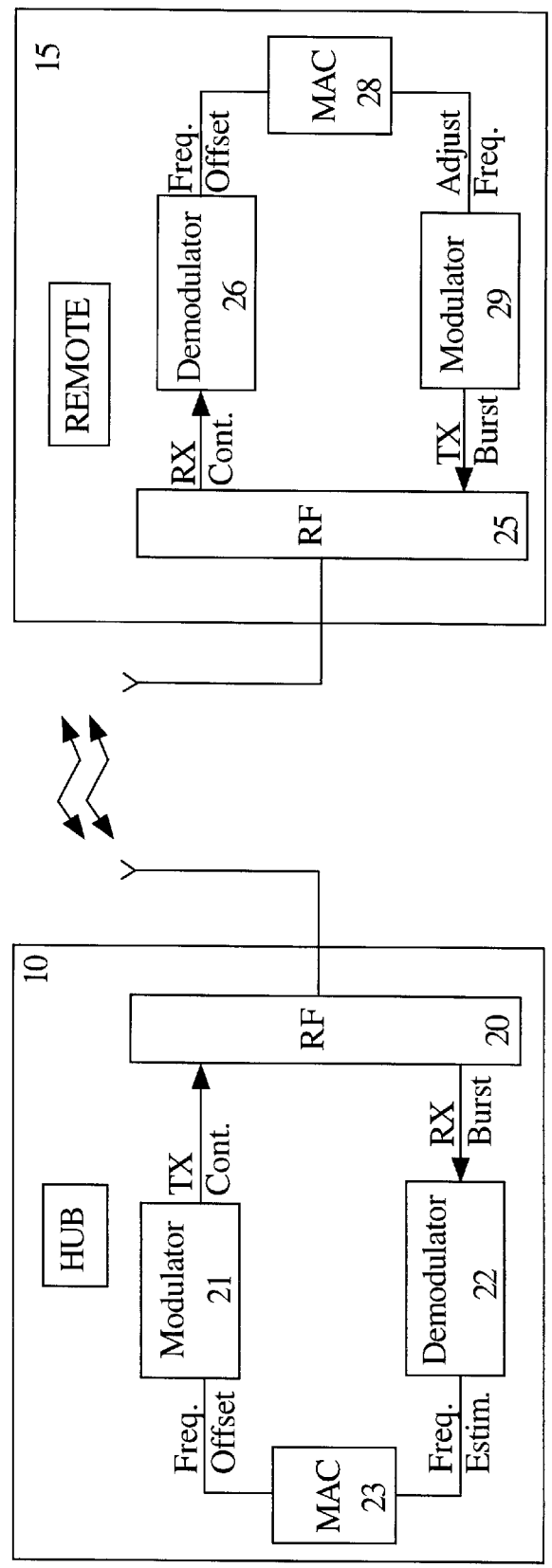
FIG. 2 is a high level schematic representation of a conventional ranging process utilizing a cable modem.

FIG. 2 illustrates a cable modem communication system which uses a typical ranging technique to correct the frequency offset between a hub radio and a remote radio. The hub radio and remote radio both include an RF transmit and receive section, a modulator, a demodulator and a media access controller (MAC).

In operation, a process called ranging occurs when a remote is first turned on, and then at periodic intervals, to correct any frequency offset that may be introduced to a remote from frequency source uncertainties. During ranging, a burst transmission is sent from the remote radio 15 to the hub radio 10. The hub RF section 20 receives the ranging transmission and sends it to the demodulator 22. The demodulator 22 estimates the frequency of the received burst and provides it to the MAC 23. The demodulator can estimate the frequency of the received signal using conventional quantitative signal sampling techniques. The MAC 23 receives the frequency estimation of the received signal and determines a frequency offset correction for the remote radio 15 necessary bring the remote radio in synchronization with the hub radio 10. The frequency offset correction from the MAC 23 is transmitted to the remote radio 15 via the modulator 21 and RF section 20.

The remote radio 15 receives the frequency offset correction information at the RF section 25 and passes the information to the MAC 28 via the demodulator 26. The MAC 28 adjusts the transmitting frequency of the remote radio 15 to correct the frequency offset. This cycle of the remote transmitting a ranging signal and the hub providing frequency offset correction continues until the hub radio is able to synchronize with the remote radio.

While the described prior ranging process is adequate to maintain the remote radios in synchronization with the hub radios for standard TDMA systems such as cable modem systems where the frequency offset is typically less than 64 kHz, it is unable to maintain the radios in synchronization at higher frequency offsets experienced in Broadband Wireless Access systems where frequency offsets can be as high as 400 kHz.

Applicant's disclosure provides a communication system that permits radio synchronization at higher frequency offsets than permitted by the conventional system and yet does not require the complex quantitative signal analysis used to estimate frequency offsets.

In one embodiment, a TDMA point-to-multipoint Broadband Wireless Access (BWA) communication system is capable of synchronizing with frequency offsets as high as 400 kHz. Applicant's disclosure does not require a complex frequency estimation and does not try to determine the frequency offset between the remote radio and the hub radio. Rather, the frequency of the remote radio is changed to a predetermined frequency offset, and then the frequency is stepwise changed as a function of the tolerance of the hub radio to synchronize.

FIG. 3 illustrates the ranging process of applicant's disclosure. The hub radio operates at a frequency $f_0$. The hub radio demodulator has a frequency tolerance of $\pm \Delta f_1$, such that the demodulator will be able to demodulate a signal if the received frequency is $f_0 \pm \Delta f_1$. At time $t_1$, the remote radio transmits at an initial ranging signal at a first frequency remote. The remote transmission is received at the demodulator and the demodulator attempts to synchronize with the signal for a predetermined period of time.

The frequency of the ranging signal is outside of the hub demodulator's synchronization tolerance and therefore the demodulator will be unable to demodulate the transmission. At the expiration of the predetermined time period, the hub radio will send an initial synchronizing message to the remote radio to change the frequency of transmission to an initial ranging frequency $-f_2$, which is a predetermined offset $-\Delta f_2$ from $f_0$.

At time $t_2$, the remote radio changes its transmission frequency to $-f_2$ and transmits another ranging signal to the hub radio. The hub demodulator will again attempt to synchronize with the ranging signal from the remote radio. After a predetermined period of time the hub demodulator will be unable to demodulate the ranging signal and the hub radio will send a synchronizing message to the remote radio to increase its transmitting frequency by a predetermined frequency correction, $2\Delta f_1$. In a preferred embodiment, the predetermined frequency correction is a function of the frequency tolerance of the hub radio to synchronize with the remote radio. Preferably, the predetermined frequency correction is approximately equal to the frequency tolerance of the hub radio to maximize the step increase in frequency of the remote radio while preventing the remote frequency from overshooting the frequency synchronization range of the hub radio.

At time $t_3$, the remote increases its transmission frequency by $2\Delta f_1$ and transmits another ranging signal to the hub radio. The hub demodulator will again attempt to synchronize with the ranging signal from the remote radio. Because the remote frequency is not within the frequency tolerance of the hub radio, the hub demodulator will be unable to demodulate the ranging signal and after a predetermined period of time the hub radio will send a synchronizing message to the remote radio to again increase its transmitting frequency by the predetermined frequency correction, $2\Delta f_1$.

With continued reference to FIG. 3, at time $t_4$, the remote frequency by $2\Delta f_1$ and a ranging signal is sent from the remote to the hub. The remote frequency is now within the frequency tolerance of the hub radio and therefore synchronization is achieved. Once synchronization is achieved at time $t_5$, the hub radio will fine tune the remote frequency to $f_0$ by performing conventional quantitative analysis of the received ranging signal and provide a fine tuning synchronization signal to the remote radio. Note that up until the time that the remote radio synchronizes with hub radio at time $t_5$, no quantitative signal sampling is required. Thus, applicant's process achieves synchronization between a hub radio and a remote radio without the use of complex signal sampling processing common in the prior art.

This stepwise change in the remote frequency continues until the hub radio can synchronize with the remote radio, or a predetermined time limit, frequency limit or some other limit is reached. In one embodiment of applicant's disclosure, the remote frequency will be stepwise increased until synchronization, or until the remote frequency reaches $+f_2$, in which case the remote frequency is changed back to the initial synchronization frequency, $-f_2$, and the ranging process begins anew.

While a stepwise increase of the remote frequency from an initial frequency offset $-\Delta f_2$ has been described, the initial synchronizing frequency can be set at a predetermined frequency offset greater than $f_0$, for example $+f_2$, and stepwise decreases of the remote frequency can be utilized to bring the remote radio to synchronization with the hub radio.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed:

1. In a communication system having a hub radio and at least one remote radio, where the hub radio operates at a first frequency $f_0$ and includes a modem with a tolerance range of synchronization of $\pm\Delta f_1$, a method of synchronizing the remote radio with the hub radio comprising the steps of:
   a) transmitting a first ranging signal from the remote radio to the hub radio;
   b) receiving the ranging signal at the hub radio;
   c) evaluating the ranging signal received at the hub and transmitting a synchronizing signal from the hub radio to the remote radio if the hub radio can not synchronize with the received ranging signal after a predetermined period of time;
   d) receiving the synchronizing signal from the hub radio at the remote radio and adjusting the frequency of transmission of the remote radio to a predetermined frequency outside the tolerance range of the modem from $f_0$;
   e) transmitting a ranging signal from the remote radio at the adjusted frequency to the hub radio;
   f) evaluating the most recently received ranging signal at the hub radio and transmitting a synchronizing signal from the hub radio to the remote radio if the hub radio can not synchronize with the ranging signal after a predetermined period of time;
   g) receiving the most recently received synchronizing signal from the hub radio at the remote radio and adjusting the frequency of transmission of the remote radio by a predetermined frequency correction;
   h) transmitting a ranging signal from the remote signal at the adjusted frequency; and
   i) repeating steps f)–h) until the hub radio can synchronize with the received ranging signal.

2. The method of claim 1 wherein:
   the step of adjusting the frequency of transmission of the remote radio to a predetermined frequency outside the tolerance range of the modem includes lowering the transmission frequency of the remote lower than $f_0$, and
   the step of adjusting the frequency of the remote radio by a predetermined frequency correction includes stepwise increasing of the transmission frequency of the remote.

3. The method of claim 1 wherein:
   the step of adjusting the frequency of transmission of the remote radio to a predetermined frequency outside the tolerance range of the modem includes raising the transmission frequency of the remote higher than $f_0$, and
   the step of adjusting the frequency of the remote radio by a predetermined frequency correction includes stepwise decreasing of the transmission frequency of the remote.

4. The method of claim 1 where the predetermined frequency outside of the tolerance range of the modem is offset from $f_0$ by approximately 400 kHz.

5. The method of claim 1 where the predetermined frequency correction is a function of the tolerance of the modem.

6. The method of claim 5 where the predetermined frequency correction is approximately equal to the tolerance of the modem.

7. The method of claim 1 where the hub and remote radio transmit utilizing Time Division Multiple Access (TDMA) point to multipoint communication.

8. A communication system having a hub radio and at least one remote radio, a method of synchronizing the hub radio and the remote radio to the same frequency, said hub radio capable of synchronizing within a predetermined frequency offset, comprising the steps of:
   a. transmitting first modulated ranging data from a remote radio to the hub radio at a first frequency;
   b. receiving the ranging data at the hub radio for demodulation;
   c. transmitting a first synchronizing message from the hub radio to the remote radio if the hub radio is unable to demodulate the received ranging data after a predetermined period of time;
   d. receiving the synchronizing message at the remote radio and adjusting the transmitting frequency of the remote radio to an initial synchronizing frequency in response thereto;
   e. transmitting ranging data from the remote radio to the hub radio at the adjusted frequency; and
   f. receiving the most recently received ranging data transmitted by the remote radio at the hub radio for demodulation;
   g. transmitting a synchronizing message from the hub radio to the remote radio if the hub radio is unable to demodulate the ranging data after a predetermined period of time;
   h. receiving the most recently received synchronizing message at the remote radio and adjusting the transmitting frequency of the remote radio as a function of the predetermined frequency offset;
   i. transmitting ranging data from the remote radio to the hub radio at the adjusted frequency; and
   J. repeating steps f–i until the hub radio successfully demodulates the ranging data.

9. The method of claim 8 wherein:
   the step of adjusting the frequency of transmission of the remote radio to an initial synchronizing frequency includes lowering the transmission frequency of the remote lower than $f_0$, and
   the step of adjusting the frequency of the remote radio as a function of the predetermined frequency offset includes stepwise increasing the transmission frequency of the remote.

10. The method of claim 8 wherein:
    the step adjusting the frequency of transmission of the remote radio to an initial synchronizing frequency includes raising the transmission frequency of the remote higher than $f_0$, and
    the step of adjusting the frequency of the remote radio as a function of the predetermined frequency offset includes stepwise decreasing the transmission frequency of the remote.

11. The method of claim 8 where the initial synchronizing frequency is offset from $f_0$ by approximately 400 kHz.

12. The method of claim 8 where the hub and remote radio transmit utilizing using Time Division Multiple Access (TDMA) point to multipoint communication.

13. In a communication system using Time Division Multiple Access (TDMA) having a hub radio and at least one remote radio, where the hub radio is capable of synchronizing with the remote radio within a predetermined frequency offset and where the hub radio synchronizes with the remote radio by providing frequency feedback to the remote radio, the improvement comprising wherein the hub radio causes the remote radio to change transmitting frequency of the remote radio as a function of the predetermined frequency offset.

14. In a communication system using Time Division Multiple Access (TDMA) having a hub radio and at least one remote radio, where the hub radio is capable of synchronizing with the remote radio within a predetermined frequency offset and within a predetermined period of time, the improvement comprising wherein the transmitting frequency of the remote radio is stepwise changed as a function of the predetermined frequency offset to thereby increase the frequency range of capture of hub radio within the predetermined period of time.

15. The method of claim 14, wherein each stepped change in transmitting frequency of the remote is approximately equal to the predetermined frequency offset.

16. In a communication system using Time Division Multiple Access (TDMA) having a hub radio and at least one remote radio, where the hub radio is capable of synchronizing with the remote radio within a predetermined frequency tolerance and where the hub radio synchronizes with the remote radio by providing frequency feedback to the remote radio, the improvement comprising wherein the hub radio initially causes the remote radio to change transmitting frequency of the remote radio to a frequency outside of the predetermined frequency tolerance when the hub radio senses that the remote radio is no longer synchronized.

* * * * *